Patented Aug. 22, 1944

2,356,702

UNITED STATES PATENT OFFICE 2,356,702

PROCESS FOR THE PRODUCTION OF SYNTHETIC LINEAR CONDENSATION POLYAMIDES

Paul Schlack, Berlin-Treptow, Germany; vested in the Alien Property Custodian

No Drawing. Application July 31, 1940, Serial No. 348,683. In Germany May 11, 1939

1 Claim. (Cl. 260—78)

This invention relates to new compositions of matter and more particularly to synthetic linear condensation polyamides and to filaments, fibers, yarns, fabrics and the like prepared therefrom.

By heat-condensation of bifunctional polyamide-forming components like amino carboxylic acids and their derivatives, for instance esters, amides, lactams, formyl compounds, urethanes or mixtures or salts of equivalent portions of one or several diamines and one or several dicarboxylic acids or mixtures of functional derivatives of the acids, for instance esters, amides and dicarboxylic acids or derivatives of the amines, for instance formyl compounds, N'-carboxylalkyl-substituted primary amino compounds and dicarboxylic acids, synthetic resins or artificial materials of very high molecular weight are obtained, when the components are so chosen, that tendency for the formation of hetero rings, especially with 5 and 6 ring members, either does not exist or exists to a very small extent only.

Also mixtures of various amide-forming bifunctional compounds, for instance of amino acids or of a pair of substances, especially diamines and dicarboxylic acids, were condensed together, for instance two or several various amino acids for themselves or amino acids or derivatives of such acids, for instance lactams with one or several salts obtained from diamines and dicarboxylic acids. There were obtained mixed condensates with properties diverging in many cases from those of uniform compounds.

In these cases the condensation reaction cannot be entirely foreseen, because it depends on the reaction velocity of the single components or the reactants at the respective temperature, which of the components react preferably and which of them come into reaction later and more slowly. In the extreme it may happen that an amide-forming component reacts first nearly entirely by itself. As a rule the irregular mixed condensates show increased transparency and solubility compared with the uniform products, whereby the melting point simultaneously decreases. On the other hand structures formed therefrom show usually after the cold-drawing or cold-rolling a somewhat lower degree of orientation than the uniform polyamides.

This invention has as an object the preparation of new and valuable compositions of matter, particularly synthetic fiber-forming materials.

A further object is the preparation of filaments, fibers, ribbons and foils from these materials.

A further object is to form these materials by casting, die-casting, injection moulding or rolling into useful articles.

A further object is the manufacture of yarns, fibers and the like from said filaments.

Further objects will become apparent from the detailed specification following hereinafter.

It has been found that very valuable condensation- and mixed condensation products, which differ in their properties from those obtained by direct condensation of the same fundamental components, are obtained, when the condensation wholly or in part is carried out with bifunctional components adapted for amide formation, the chain of which contains already CO-NR-groups (R=H or a monovalent organic radical) stable at reaction temperature and which are, if necessary, interrupted, by other hetero atoms or atom groups like O, S, N, SO, $SO_2$. By CO-NR-groups, practically stable at reaction temperature, such amino groups are to be understood, as do not react in the condensation mixture with separation of a carbonyl group. Urethane compounds derived from primary amino groups, which consequently react in the presence of carboxyl compounds by splitting off alcohol and carbon dioxide, are intentionally excepted here as components according to the present invention, provided they do not contain the stable-CO-NR-group in the chain.

By fundamental components there are meant the simple building stones in which the polyamides are split up by acid hydrolysis.

Preferably the components according to the present invention are used as much as possible in a uniform state. In order to obtain special effects, for instance with regard to solubility, any mixture may be used for condensation, provided that the functional groups are present in the equivalent proportion necessary for polyamide formation. As the substances already containing amide groups in most cases are very little or not at all volatile, advantages result during the practice of the condensation; quite often it is unnecessary to use pressure vessels. Besides the components containing amide groups in the chain also numerous other substances or pair of substances suitable for polyamide formation in the heat may be present in the mixture, for instance amino carboxylic acids and functional derivatives of such acids like esters, amides, lactams, formyl compounds, N-carboxyl alkyl compounds or salts from diamines and dicarboxylic acids or mixtures from derivatives of diamines and dicarboxylic acids or from derivatives of dicarboxylic acids with diamines suitable for polyamide formation between each other.

Also finished polyamides which may be transformed into higher molecular products by after-condensation may be added to the reaction mixture.

The components according to this invention may be bifunctional containing two identical radicals, for instance two COOH-groups, i. e., for instance they may be substituted twice by an amino group or by a carboxyl group. As will be shown later on such compounds are synthetically obtainable in many ways, especially symmetrically built compounds which are generally to be preferred. But also bifunctional compounds with two different radicals, for instance amino carboxylic acids, are within the scope of the present invention, through bifunctional compounds of the same character are more easily obtainable as a rule. Instead of compounds with amino groups and carboxyl groups besides amide groups, also functional derivatives of them may be used, for instance esters with low alcohols or phenols, formyl amino compounds and urethanes derived from primary amino compounds.

Typical reactions used for the synthesis of components according to this invention are contained in the examples and arranged in the following table.

TABLE

Uniform bifunctional components containing amide groups in the chain.

(I) COMPOUNDS WITH ONE AMIDE GROUP (a) Dicarboxylic acids:

HOOC—(CH₂)ₓ—NR—CO—(CH₂)ᵧ—COOH where $x$ is at least 5, $y$ is at least 3, preferably 4 or more, and R=monovalent organic radical, especially alkyl.

*Example*

Reaction product from methylester adipic acid chloride with ε-amino caproic acid, if desired changed by alkaline saponification into the dicarboxylic acid.

(b) Diamine:

H—NR—(CH₂)ₓ—CO—NR—(CH₂)ᵧ—NRH where $x$ is at least 5, $y$ at least 4.

*Example*

Reaction product of the carboxyethyl-ε-amino caproic acid chloride (from the acid with thionylchloride) with monocarboxyethyl-hexamethylene diamine (the latter being obtained by action of chloroformic acid ethylester on excess hexamethylene-diamine). The diurethane is directly condensable with dicarboxylic acids.

(c) Amino carboxylic acid:

H—NR—(CH₂)ₓ—NR—CO—(CH₂)ᵧ—COOH where $x$ is at least 4, $y$ at least 3, preferably 4 or more.

*Example*

Reaction product of one mol glutaric acid with one mol hexamethylene diamine in benzene.

(II) COMPONENTS WITH TWO AMIDE GROUPS (a) Dicarboxylic acids:

HOOC—(CH₂)ₓ—NR—CO—A—CO—NH—(CH₂)ₓ—COOH where $x$ is at least 5, A=bivalent organic radical, which in the simplest case may be =0.

*Example*

Oxalyl-bis-amino caproic acid. Instead of the oxalic acid also its homologs or analogs may be used, for instance malonic acid, glutaric acid, adipic acid, sebacic acid, γ-thiodibutyric acid, γ-oxydibutyric acid, aromatic dicarboxylic acids like terephthalic acid, isophthalic acid.

(b₁) Diamino compounds:

HNR—(CH₂)ᵧ—NH—CO—A—CO—NH—(CH₂)ᵧ—NHR where $y$ is at least 4.

*Example*

Reaction product from oxalic acid diethylester and N-monomethyl-hexamethylene diamine. Preferably such components are suitable for the condensation, which are onesided monosubstituted for instance by an alkyl radical, an acyl radical, for instance formyl- or carboxyl radical, which latter do not disturb the reaction. Instead of the oxalic acid also other dicarboxylic acids may be used as described under a. In the same manner the diamine may be replaced by diamino compounds with hetero atoms interrupting the chain, for instance by ββ'-diamino diethylether or ββ'-diamino diethylsulfide.

(b₂) Diamines:

HNR—(CH₂)ₓ—CO—NR—(CH₂)ᵧ—NR—CO—(CH₂)ₓ—NHR where $x$ is at least 5, $y$=at least 4.

*Example*

Reaction product from two mols N-monomethyl-ε-amino-caproic acid methylester with one mol hexamethylene diamine (in the presence of a small amount of sodium ethylate).

(c) Amino carboxylic acids:

NHR—(CH₂)ᵧ—NR—CO—A—CO—NR—(CH₂)ₓ—COOH where $x$ is at least 5, $y$=at least 4.

*Example*

ε-amino caproic acid is caused to react with excess oxalic acid diethylester and the obtained N-ethylester oxalyl ε-amino caproic acid is caused to react with N-monomethyl pentamethylene diamine.

(III) COMPONENTS WITH MORE THAN TWO AMIDE GROUPS (a) Dicarboxylic acids:

HOOC—(CH₂)ₓ—NR—CO—(A)—CO—NR—(CH₂)ᵧ—NR—CO—A—CO—NR—CH₂—COOH

*Example*

Hexamethylene diamine is caused to react with excess oxalic ester into the bis-oxamide acid ester. The latter is condensed with ε-amino caproic acid ester in alcohol solution and then saponified in alkaline solution.

(b) Diamines:

HNR—(CH₂)ᵧ—NR—CO—(A)—CO—NR—(CH₂)ᵧ—NR—CO—A—CO—NR—(CH₂)ᵧ—NR

*Example*

Hexamethylene-bis-oxamide acid ester is condensed with two mols monomethyl hexamethylene diamine.

(IV) Compounds With One Urea Radical (a) Dicarboxylic acids:

HOOC—(CH$_2$)$_x$—NR—CO—NR—(CH$_2$)$_x$—COOH where $x$ is at least 5.

*Examples*

Carbonyl-bis-ε-amino caproic acid.
Carbonyl-bis-NN'-dimethyl-amino caproic acid. (Obtainable from the amino acid esters with phosgene or diphenyl carbonate and followlowing saponification.)

(b) Diamines:

HNR—(CH$_2$)$_y$—NR—CO—NR—(CH$_2$)$_y$—NRH where $y$ is 4 or more.

*Example*

Reeaction of N-carboxyethyl-N'-monomethyl hexamethylene diamine with phosgene. The diurethane is directly condensable with dicarboxylic acids. The thermal resistance is increased by methylation of the urea-nitrogen-atoms.

(c) Amino carboxylic acids:

HNR—(CH$_2$)$_y$—NR—CO—NR—(CH$_2$)$_x$—COOH

*Example*

Condensation of carbamic acid phenylester-ε-amino caproic acid methylester with NN'-dimethyl hexamethylene diamine.

(V) Urea Derivatives Containing More Than One Urea-Group in the Molecule (a) Dicarboxylic acids:

HOOC—(CH$_2$)$_x$—NR—CO—NR—(CH$_2$)$_y$—NR—CO—NR—(CH$_2$)$_x$—COOH

*Example*

NN'-dimethyl hexamethylene diamine is transformed with phosgene into the hexamethylene diamine-bis-carbamic acid chloride. The latter is coupled with ε-amino caproic acid or 9-amino nonanoic acid.

(b) Diamines:

HNR—(CH$_2$)$_y$—NR—CO—NR—(CH$_2$)$_y$—NR—CO—NR—(CH$_2$)$_y$—NRH

*Example*

Hexamethylene-bis-carbamic acid chloride is condensed with N-carboxyethyl-hexamethylene-diamine.

The above table which is in no way considered to be complete, shows how extensively the components according to this invention may be transformed. The invention, however, is not limited to the types mentioned there and to the components described in the examples. Within the scope of this invention lies also, generally speaking, the use of bifunctional components adapted for polyamide-formation, the chains of which are interrupted by amide groups (urea groups) once or several times, for the manufacture of high molecular polyamides with preferably linear structure. Excepted here are only the simple urethane compounds derived from primary amines, whereas urethanes from secondary amino compounds, for instance diurethanes from NN'-dimethyl-hexamethylene diamine or urethanes from secondary amino carboxylic acids, for instance from N-methyl-ε-amino caproic acid are within the scope of this invention. Of the secondary urethane compounds are those especially reactive in which the carboxyl is esterified with an aromatic or enolic hydroxyl compound, for instance with phenol, phenol homologs or halogenated phenols like p-chloro-phenol or p-chloro-m-cresol.

In the cases mentioned in the table bifunctional compounds were built up with amide groups from bifunctional starting materials. However, it is also possible to introduce the final end-groups by other groups being nonreactive in the sense of the final product, for instance by exchange of reactive halogen against amino- or nitrile groups, by reduction of nitrile groups or nitro groups or by oxidation of hydroxyl groups for instance.

Especially valuable are starting materials which already contain two or more amide groups, for instance the dicarboxylic acids easily obtainable which consist of a central dicarboxylic acid radical and two amino acids on each side. As central dicarboxylic acid the inexpensive oxalic acid is especially useful. With the aid of this component it is also possible to increase the melting point sometimes considerably. Especially such diurea compounds are easily accessible besides the simple urea dicarboxylic acids, which show as central member the radical of a diamine. Especially resistant thermally are ureas containing alkyl groups, especially methyl groups on the nitrogen atom.

Only two components are preferably used for the condensation, if it is intended to prepare uniformly built polyamides. By condensing another component into the polyamide, the radical of which is not yet contained in the bifunctional compound with amide groups, very valuable, uniform mixed-polymerisates are obtained. The uniform mixed-condensates consisting of more than two functional components are more valuable for many purposes, for instance for the manufacture of artificial filaments, than those being irregularly built, which, however, in another respect possess advantages. By mixing the polyamides in various proportions, the properties may be extensively varied.

The condensation of the bifunctional compounds according to the present invention with themselves or with other components containing opposite or supplementary functional groups is accomplished in the usual manner, i. e., by heating to reaction temperature in the presence or absence of solvents or diluents, for instance phenols, glycols, low alcohols and water. One may work partly at atmospheric pressure and, if necessary, partly at increased or reduced pressure. The temperature suitable for the reaction is easily found in every case by preliminary tests. It lies as a rule between 150 and 280° C. When using very reactive reactants, for instance carboxylic acid arylesters, carbamic acid arylesters or isocyanates, even at temperatures below 150° C. very valuable condensation products are obtained. This is important, if components liable to decompose or to give side-reactions are present for instance sulfo compounds like ββ'-diamino-diethyl-sulfide or dicarboxylic acids tending to form cyclic monomers like glutaric acid.

Within the scope of this invention there lie also the condensations with bifunctional compounds which besides or instead of acyclic or exocyclic amide groups show hetero rings interrupting the chain with cyclic-bound amide groups. Other components reacting by themselves in the heat under amide-formation may be present besides the components containing amide groups or their combinations with bifunctional compounds (reactive with identical or different radicals), for instance ω-amino carboxylic acids and functional derivatives of analogous esters, amides, formyl compounds, N-carboxylic acid compounds derived from primary amino compounds, nitriles, lactams, salts of diamines and dicarboxylic acids, also equivalent portions of reactive derivatives from diamines and dicarboxylic acids or of reactive derivatives from dicarboxylic acids with diamines.

To increase the pressure or to accomplish hydrolytic, alcoholytic or aminolytic processes, for instance in the presence of esters, nitriles or lactams, the addition of water, alcohols or also ammonia may be of advantage. One works then with more or less high pressure and finally finishes the condensation under atmospheric pressure or reduced pressure, thereby eliminating the volatile ingredients of the reaction mixture.

To increase or regulate the reaction, especially to determine the final degree of polymerisation, there may be added in small quantities acid compounds or compounds splitting off acid or alkaline agents, for instance hydrochloric acid, phosphoric acid, naphthalene sulfonic acid, salts of amines with strong acids, stannous chloride, magnesium alcoholates, alkali phenolates, especially such consisting of alkyl-substituted phenols. Furthermore there may be added compounds forming neutral or relatively feeble acids or alkaline end-groups to determine the degree of condensation, for instance mono- and dicarboxylic acids, mono- and polyamines, phenol esters of monocarboxylic acids, amides, glycols. The quantity of the amide forming admixtures has to be chosen in such a way that the equivalent proportion is very little overstepped in one or the other direction.

The high molecular condensation products obtained according to the present invention may be used in various ways according to their properties. High polymeric polyamides may be worked up from the melt or from the solution, for instance in phenol, formic acid, acetic acid, in some cases also alcohols, into filaments, ribbons or foils and the like. They may be also formed by die-casting, spraying or molding in every way. Lower polymeric compounds for instance are suited for the manufacture of coatings and impregnations.

*Example I*

Two mols ε-amino caproic acid ethyl ester are caused to react in three parts absolute alcohol with 1 mol oxalic acid diethyl ester at 30° C. A great deal of the reaction products—oxalyl-bis-ε-amino caproic acid diethyl ester—is separated in flat long needles (melting point 111° C.). The rest is distilled off and the residue taken up with water for purification. The substance may be recrystallized from alcohol.

This ester is saponified in boiling alcohol by gradually discharging the calculated amount of aqueous alkaline liquor into it. The alcohol is distilled off, the reaction product dissolved in water and the oxalyl-bis-amino caproic acid (melting point 178° C.) is precipitated with hydrochloric acid.

Oxalyl-bis-ε-amino caproic acid (melting point 178° C.) is transformed with the roughly calculated amount of hexamethylene diamine in 60 per cent alcohol into the difficultly soluble salt (melting point 240° C.). This salt is melted in a nitrogen atmosphere at 240° C. The temperature is then raised after one hour to 250° C. and kept there four more hours. A nearly bubble-free clear viscous melt is obtained after that time which, when cooled down, solidifies into a transparent, feebly colored resin. The polyamide melts at 185° C. and may be drawn from the melt into fine fibres or bristles which can be oriented by cold drawing. The condensation product is much larger than the polyamide from amino caproic acid or ε-capro lactam (melting point 211–213° C.).

*Example II*

ε-amino caproic acid ethyl ester is caused to react, while cooling, with phosgene in toluene. There is obtained in good output the carbonyl-bis-amino caproic acid diethyl ester (melting point 118° C.). By saponification with aqueous alcoholic alkaline liquor in a little more than the calculated amount at 40° C. the dicarboxylic acid is obtained (needles from alcohol, melting point 162–164° C.).

The acid in aqueous alcohol is united with the calculated amount of hexamethylene diamine and the salt thus formed is isolated.

A part of the salt is heated in a nitrogen atmosphere at 180° C. for three hours. The temperature is then raised to 200° C. and kept another five hours at that temperature. After that relatively short time of heating, at moderate temperature, the substance could be drawn into filaments easily to be oriented.

The same polyamide is obtained when the ester is condensed with the diamine. In this case it is useful to heat first for two hours in a sealed vessel, then the reaction product is further heated after evaporation of the alcohol at atmospheric pressure in a nitrogen atmosphere at 220° C. for nine more hours.

*Example III*

One mol hexamethylene diamine is heated in one part alcohol (by weight) with two mols cyanoacetic acid methyl ester for one hour on the water bath. When cooled down, the mass solidifies to a crystalline product NN'-dicyanoacetyl hexamethylene diamine. This dinitrile may be easily hydrolyzed with alcohol and hydrochloric acid over the imino ether to hexamethylene-bis-malonic acid diethylester amide

$(H_5C_2OOCCH_2COHN(CH_2)_6NHOCCH_2COOC_2H_5)$

If this ester is heated in xylenol with the equivalent amount octamethylene diamine for 6–12 hours at 225° C., a polyamide is obtained which can be spun. The malonic ester amide is also obtained by a reaction of hexamethylene diamine with malonic ethylester acid chloride.

*Example IV*

Two mols sodium salt of the sebacic acid monomethyl ester and one mol hexamethylene diamine are heated at 100–130° C. with diethylene glycol until no methanol distills off. After removal of the glycol in vacuo the product is dissolved in water and the dicarboxylic acid precipitated with hydrochloric acid. If this is heated with the equimolecular amount octamethylene diamine for 8 hours at 210–230° C., a polyamide capable of being spun is obtained, if the product is worked up in the usual manner. The reaction product is not identical with the polyamide obtained when condensing together two mols sebacic acid, one mol hexamethylene diamine and one mol octamethylene diamine.

Example V

One mol NN'-dimethyl hexamethylene diamine in benzene are condensed with two mols chloroformic acid-xylenylester (from technical xylenol) and the hexamethylene-bis-methyl carbamic acid xylenylester is also condensed in the proportion one mol : one mol with octamethylenediamine at 210° C. (the amino hydrochloride formed as by-product is separated off) until the viscosity of the melt is not increased any more. After diluting with xylenol the reaction product is precipitated with alcohol. The polyamide thus obtained is soluble in strong formic acid and may be cast into foils from this solution.

Example VI

One mol glutaric acid dichloride is boiled with two mols N-methyl aminocaproic acid ethylester hydrochloride, obtained by esterification of methyl aminocaproic acid with hydrochloric acid and alcohol, in benzene until the development of hydrogen chloride is finished. The solvent is distilled off and the residue saponified with alcoholic aqueous caustic soda solution. The dicarboxylic acid thus obtained is heated with one mol octamethylene-bis-carbamic acid diphenylester at 200° C., whereupon polyamide-formation quickly results by splitting off phenol and carbon dioxide. The mixture is carefully heated until the viscosity does not increase any more, dissolved in phenol and precipitated with acetone. The product may be spun into filaments from the melt. Also the analogous product from amino caproic acid can be spun. The polyamide containing methyl-substituted amide groups is thermally more resistant.

Example VII

One mol sebacic acid methylester acid chloride (obtained from the ester acid with thionylchloride) is boiled with one mol hydrochloric ε-amino caproic acid methylester in benzene, until the development of hydrogen chloride is finished. The benzene is distilled off and to the residue there is added one mol hexamethylene diamine. The whole is then heated in a sealed vessel at 230° C. for 2½ hours. After removal of the excess pressure the temperature is raised at 250° C. and kept there for 7 hours. The polyamide thus obtained may be drawn into fine filaments directly from the melt. It is not identical with the product obtained, if one mol neutral salt of sebacic acid and hexamethylene diamine is condensed under similar conditions with one mol ε-caprolactam.

Example VIII

Two mols ε-amino caproic acid methylester and octamethylene diisocyanate are united in benzene and the dicarboxylic acid ester obtained under evolution of heat, the chain of which is interrupted by the radical of the octamethylene diurea, is condensed after adding xylenol with a further mol octamethylene diamine at 230° C. The reaction product is first heated one hour in a sealed vessel, then 7 hours under atmospheric pressure in a nitrogen atmosphere. The reaction product is isolated by precipitating with alcohol. By molding hard structures are obtained.

Example IX

One mol bis-ε-amino caproyl hexamethylene diamine is heated with one mol ethylene carbamide-NN'-γ-dibutyric acid in two parts xylenol at 220° C. After 7 hours the polyamide thus formed is precipitated after diluting with a further amount of xylenol by discharging it in acetone. The product is remelted under exclusion of atmospheric oxygen and may be drawn into filaments directly from the melt.

Example X

ε-amino caproic acid methyl ester in methylene chloride is transformed with the aid of chloroformic acid xylenyl ester into methyl carbamic acid xylenyl ester-N-ε-caproic acid methyl ester. This is heated with 1 mol hexamethylenediamine at 100° C. first for one hour, the temperature is then raised after sealing the reaction vessel at 200° C., then heated for 2 hours under pressure, the pressure reduced and condensed 4 hours more at 220° C. The reaction mass is worked up with acetone. Instead of hexamethylenediamine also piperazine may be employed for condensation.

Example XI

Hexamethylenediamine is discharged into a 30% alcoholic solution in excess of oxalic acid diethyl ester. After leaving at room-temperature hexamethylene-bis-oxamic acid diethyl ester (melting point 89°) is formed in good output. This ester reacts at 30–40° C. very easily in alcoholic solution with 2 mols ε-amino caproic acid ethyl ester under formation of the dicarboxylic acid ester of the formula

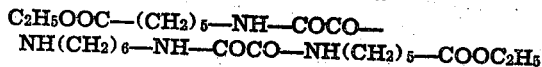

$C_2H_5OOC-(CH_2)_5-NH-COCO-NH(CH_2)_6-NH-COCO-NH(CH_2)_5-COOC_2H_5$

This ester may be condensed by itself or after saponification with alcoholic aqueous alkaline liquor in the presence of xylenol with the equivalent amount octamethylenediamine. In the first case the mixture of the components is first heated for one to two hours in a sealed vessel at 200–210° C. and then after releasing the pressure in a nitrogen atmosphere 9 hours more at 230° C. In the second case it is condensed for 8 hours at 225–230° C. in a nitrogen atmosphere.

Example XII

ε-amino caproic acid ethyl ester is discharged into excess oxalic acid diethyl ester in alcohol and the solution is heated at 60° C., until the alkaline reaction disappears. Thereby is formed, nearly exclusively, the oxamide acid ethyl ester-N-ε-caproic acid ethyl ester which may be easily separated from a small quantity of oxal-bis-amino caproic acid ester formed as by-product in small quantity difficultly soluble in alcohol. If the oxamide acid ester is caused to react with the equivalent amount N-monomethyl pentamethylenediamine (from ε-chloro amyl benzamide and methylamine with following hydrolysis), the amino acid ester of the following formula is obtained in good output

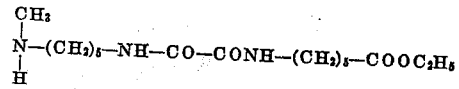

$$\begin{array}{c} CH_3 \\ | \\ N-(CH_2)_5-NH-CO-CONH-(CH_2)_5-COOC_2H_5 \\ | \\ H \end{array}$$

After saponification with aqueous alcoholic alkaline liquor the amino acid yields after heating in xylenol at 225° C. for 12 hours a polyamide which can be spun.

Example XIII

One mol NN'-bis-ε-amino caproyl hexamethylenediamine is heated with one mol m-benzene disulfo-bis-ε-amino caproic acid (crystallizing with water in laminae, melting point 173–174°)

in xylenol for 7 hours at 220° C. The reaction product purified from xylenol by reprecipitating is soluble in diluted caustic soda solution and is precipitated by acetic acid. The raw product may be dissolved also directly in the alkaline liquor, acidified with acetic acid and liberated from xylenol by steam distillation. The product may be added to alkaline cellulose solutions, for instance solutions of alkali-soluble cellulose ethers, and may be coagulated together with them.

mols) 2-amino caproic acid is added to the molten anhydride (1 mol) and the mixture carefully heated, until the separation of water is finished. The dicarboxylic acid thus obtained of the following formula

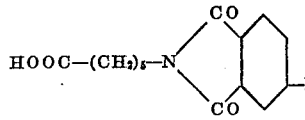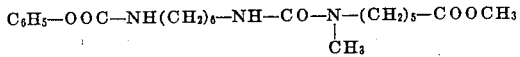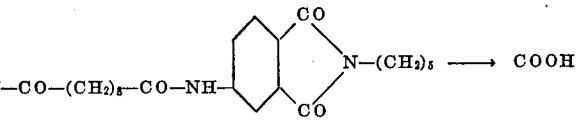

Example XIV

A warm solution of excess hexamethylene-biscarbamic acid diphenyl ester (melting point 138°) in benzene is discharged, while stirring into N-methylamino caproic acid methylester, also dissolved in benzene. The ester thus formed of the formula $$C_6H_5-OOC-NH(CH_2)_6-NH-CO-N-(CH_2)_5-COOCH_3$$
$$\hspace{5cm}|$$
$$\hspace{5cm}CH_3$$

is transformed by saponification with aqueous baryta solution and by following removal of the barium with the aid of sulfuric acid into ω-aminohexyl carbaminyl-N-methylamino caproic acid. The acid may be easily condensed in xylenol into a polyamide which may be spun into filaments directly from the melt.

The dicarboxylic acid ester may be condensed also with bivalent amines, for instance NN'-dimethylhexamethylenediamine. The use of secondary bases is of advantage in this case, as the urethanes or isocyanates derived from primary amino compounds yield urea compounds which may be retransformed in the heat. Besides that, the danger of net-formation is avoided by using secondary amino groups.

Example XV 2 mols 5-aminophthalic acid are coupled in alkaline solution with 1 mol sebacic acid chloride. The tetracarboxylic acid separated with the aid of acids is transformed into the anhydride by heating in vacuo. The calculated amount (2 mols) 2-amino caproic acid is added to the molten anhydride (1 mol) and the mixture carefully heated, until the separation of water is finished. The dicarboxylic acid thus obtained of the following formula is condensed in xylenol with octamethylene diisocyanate in the proportion 1 mol : 1 mol. By splitting off carbondioxide a high molecular polyamide precipitable with acetone is obtained. The polyamide becomes water soluble by heating with diluted caustic soda solution under cleavage of the imide groups.

By using diisocyanates as coupling components the danger of splitting up the imide rings during the condensation is avoided.

Example XVI

In a sealed vessel, in which the air is replaced by carbondioxide, exactly equivalent proportions of hexamethylenediisocyanate and oxalyl-bis-ε-amino caproic acid are heated in the beginning at 200° C., until no further rise of pressure occurs. The formed carbondioxide is then carefully removed and the mixture is heated at 230° C. for two more hours without pressure. The mixed polymerisate thus obtained may be formed directly from the melt into filaments which can be drawn in the cold.

As there is no humidity present in the reaction mixture hydrolytic by-products are not formed. A product is therefore obtained, in which a very regular structure formation must be assumed.

What I claim is:

A process for the manufacture of high molecular linear polyamides which comprises heat condensing with splitting off of phenol and carbon dioxide one mol of octamethylene-bis-carbamic acid diphenyl ester with one mol of the dicarboxylic acid obtained by the saponification of the reaction product of heating one mol of glutaric acid dichloride with two mols of N-methyl aminocaproic acid ethylester hydrochloride.

PAUL SCHLACK.